Figure 1:
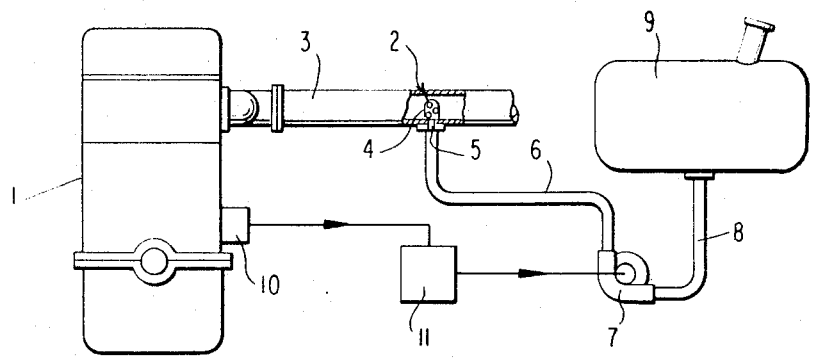

United States Patent
Langen

[11] 3,731,666
[45] May 8, 1973

[54] FLAME STARTING INSTALLATION FOR AN AIR-COMPRESSING INJECTION INTERNAL COMBUSTION ENGINE

[75] Inventor: Herbert Langen, Altbach, Germany

[73] Assignee: Daimler-Benz Aktiengesellschaft, Stuttgart-Unterturkheim, Germany

[22] Filed: Nov. 4, 1970

[21] Appl. No.: 86,784

[30] Foreign Application Priority Data

Nov. 4, 1969  Germany..................P 19 55 379.8

[52] U.S. Cl.........123/179 H, 123/122 H, 123/122 G, 123/142.5
[51] Int. Cl............................................F02m 31/04
[58] Field of Search.................123/179 H, 142.5, 123/119 R, 122 H, 122 G

[56] References Cited

UNITED STATES PATENTS

| | | | |
|---|---|---|---|
| 2,633,698 | 4/1953 | Nettel | 60/13 |
| 3,024,777 | 3/1962 | Baker | 123/142.5 |
| 3,036,564 | 5/1962 | Guiot | 123/119 R |
| 3,093,126 | 6/1963 | Baker | 123/142.5 |
| 3,353,520 | 11/1967 | Haag | 123/179 H |
| 3,379,184 | 4/1968 | Wolf | 123/179 H |
| 3,526,214 | 9/1970 | Kamo | 123/122 |

Primary Examiner—Al Lawrence Smith
Assistant Examiner—Cort R. Flint
Attorney—Craig, Antonelli and Hill

[57] ABSTRACT

A flame-starting installation for an air-compressing injection internal combustion engine with a feed of the fuel by an electrically driven feed pump, in which the fuel rate feed of the fuel pump is a nonlinear function of the engine rotational speed over at least a portion of the entire rotational speed range of the engine.

5 Claims, 2 Drawing Figures

INVENTOR
HERBERT LANGEN

BY Craig, Antonelli, Stewart & Hill
ATTORNEYS

FLAME STARTING INSTALLATION FOR AN AIR-COMPRESSING INJECTION INTERNAL COMBUSTION ENGINE

The present invention relates to a flame-starting installation for an air-compressing injection internal combustion engine with a feed of the fuel by an electrically driven feed pump.

For the starting of internal combustion engines operating according to the Diesel process, flame glow plugs for the combustion of injected fuel are arranged, as is known, in the air suction or intake pipe of the engine in order to attain a heating-up of the intake or suction air.

In accordance with the present invention, the flame starting installation is continuously utilized for heating-up of the intake or suction air after the starting of the engine in the Diesel process over the rotational speed range of the engine for the earliest possible attainment of average temperature of operation. The present invention is thus concerned with the task of increasing the fuel quantity to the flame starting installation for combustion in accordance with the larger rate of air flow which increases with higher rotational speeds of the engine while insuring that at lower engine rotational speeds too much of the oxygen in the air sucked in through the suction pipe of the engine is not combusted by means of the starter flame and that with high engine rotational speeds an improved warm up of the air is assured.

The underlying problems are solved according to the present invention in that the rate of fuel flow fed by the fuel pump of the flame starting installation is a nonlinear function of the engine rotational speed over at least a portion of the entire rotational speed range of the internal combustion engine.

In an advantageous construction of the present invention, the rate of fuel flow may have in dependence on the rotational speed between the starting rotational speed and about fifty percent of the rated rotational speed range, possibly a step or jump-like increase in the direction of an increase in the feed.

According to the present invention, the feed quantity of the fuel supply may be constant or proportional to the rotational speed of the engine in front of and behind this jump-like increase.

Accordingly, it is an object of the present invention to provide a flame starting installation for air-compressing injection internal combustion engines which avoids by simple means the aforementioned shortcomings and drawbacks encountered in the prior art.

Another object of the present invention resides in a starting installation for internal combustion engines of the aforementioned type which assures improved starting as well as operating characteristics of the engine.

A further object of the present invention resides in a flame-starting installation for air-compressing injection-type internal combustion engines which assures the combustion of a moderate amount of oxygen from the drawn-in air at lower rotational engine speeds and a better heating-up of the air at higher engine rotational speeds.

Figure 2:
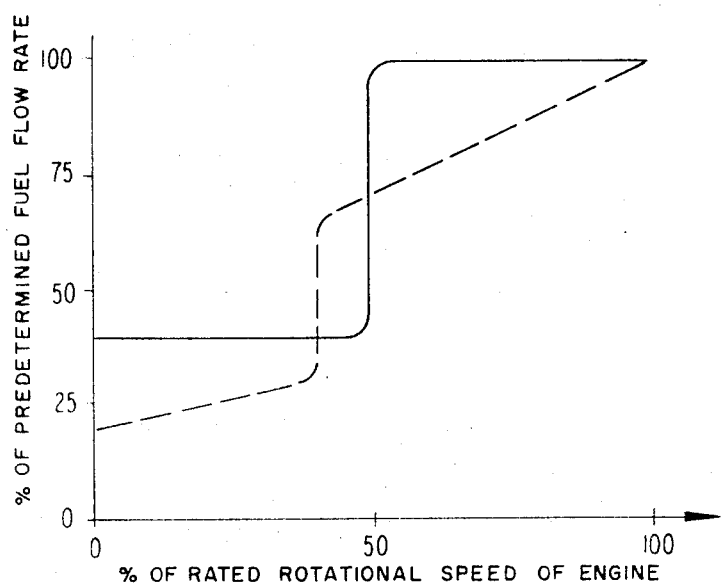

These and further objects, features and advantages of the present invention will become more obvious from the following description when taken in connection with the accompanying drawing which shows, for purposes of illustration only, one embodiment in accordance with the present invention, and wherein:

FIG. 1 is a schematic view of the installation in conjunction with a flame-starting installation for an internal combustion engine according to the present invention; and FIG. 2 is a diagram indicating the supply quantity as a function of engine rotational speed.

Referring now to the drawing, and more particularly to FIG. 1, a flame-starting installation generally designated by reference numeral 2 provided for an air-compressing injection internal combustion engine 1 of conventional construction consists of a glow plug 4 arranged in an air suction pipe 3 and of an injection aperture 5 which installation is utilized over the entire rotational speed range of the engine. The injection opening 5 is connected by way of a line 6 with an electrically driven feed pump 7 which is connected, in turn, by a further line 8 with a fuel tank 9. A control element 10 dependent on the engine rotational speed and of any conventional construction which receives a voltage from the electrical system of the internal combustion engine, feeds a control magnitude matched to the rotational speed change to a control device 11 that is arranged between the internal combustion engine 1 and the feed pump 7. This control device 11 which is of conventional construction and therefore not illustrated in detail herein, converts the control magnitude in a predetermined nonlinear manner, pre-set or stored beforehand in the control device into a fuel quantity of the fuel pump. For example, the conversion of the control magnitude by the control device 11 may be realized by a keying ratio change at constant frequency though any other system as known at present may be utilized.

As can be seen from the diagram of FIG. 2, the feed quantity of the fuel is appropriately increased with an increasing rotational speed of the internal combustion engine between the starting rotational speed and about fifty percent of rated rotational speed. This increase takes place preferably in a jump-like manner, as indicated by the step in the two curves shown in full line and in dash line. The full line thereby shows a control system in which the fuel quantity remains substantially constant from the starting rotational speed to the predetermined speed where the increase occurs in a step or jump-like manner whereas the curve in dash line indicates a control system in which an increase proportional to the engine rotational speed takes place up to the predetermined rotational speed where the step or jump-like increase occurs whereafter the increase in the fuel quantity becomes again proportional to the increase of the engine rotational speed, though the latter proportional increase may be at a different, for instance, higher rate than the former. Thus, the fuel flow rate is controlled to be a nonlinear function of the rotational engine speed over at least a portion of the rotational speed range.

While I have shown and described only one embodiment in accordance with the present invention, it is understood that the same is not limited thereto, but is susceptible of numerous changes and modification as known to those skilled in the art. For example, the curve for the fuel quantity versus engine rotational speed may have also any other desired configuration, which can be readily attained by suitably presetting the control device 11. Accordingly, I do not wish to be limited to the details shown and described herein, but intend to cover all such changes and modifications as are encompassed by the scope of the appended claims.

What I claim is:

1. A flame starting installation for an air-compressing injection type internal combustion engine comprising a suction pipe for sucking air to the engine, igniting means and an injection opening means arranged in the suction pipe, an electrically driven fuel pump connected with the injection opening means for continuously supplying fuel to be ignited in the suction pipe over the entire rotational speed range of the engine such that the air in the suction pipe is heated over the entire rotational speed range of the engine, and control means responsive to the rotational speed of the engine for controlling the fuel pump to supply fuel to the injection opening means at a flow rate which is a nonlinear function of the rotational speed of the engine over at least a portion of the entire rotational speed range of starting to rated rotational speed of the engine, said control means controlling said fuel pump to provide a step increase in the supply of fuel to the injection opening means between starting and about fifty per cent of rated rotational speed of the engine.

2. An installation according to claim 1, wherein said control means controls said fuel pump to provide the step increase in the supply of fuel at about fifty percent of the rated rotational speed of the engine.

3. An installation according to claim 1, wherein said control means controls said fuel pump to provide an essentially constant rate of fuel flow to the injection opening means in front of and behind the step increase in the fuel flow.

4. An installation according to claim 1, wherein said control means controls said fuel pump to provide a rate of fuel flow to the injection opening means which is substantially portional to the engine rotational speed in front of and behind the step increase in the fuel flow.

5. An installation according to claim 1, wherein said control means includes means responsive to the rotational speed of the engine for providing an output signal indicative thereof, and means responsive to the output signal of the rotational speed means for providing a variable output signal to said electrically driven fuel pump in accordance with a predetermined non-linear function control of said fuel pump.

* * * * *